UNITED STATES PATENT OFFICE.

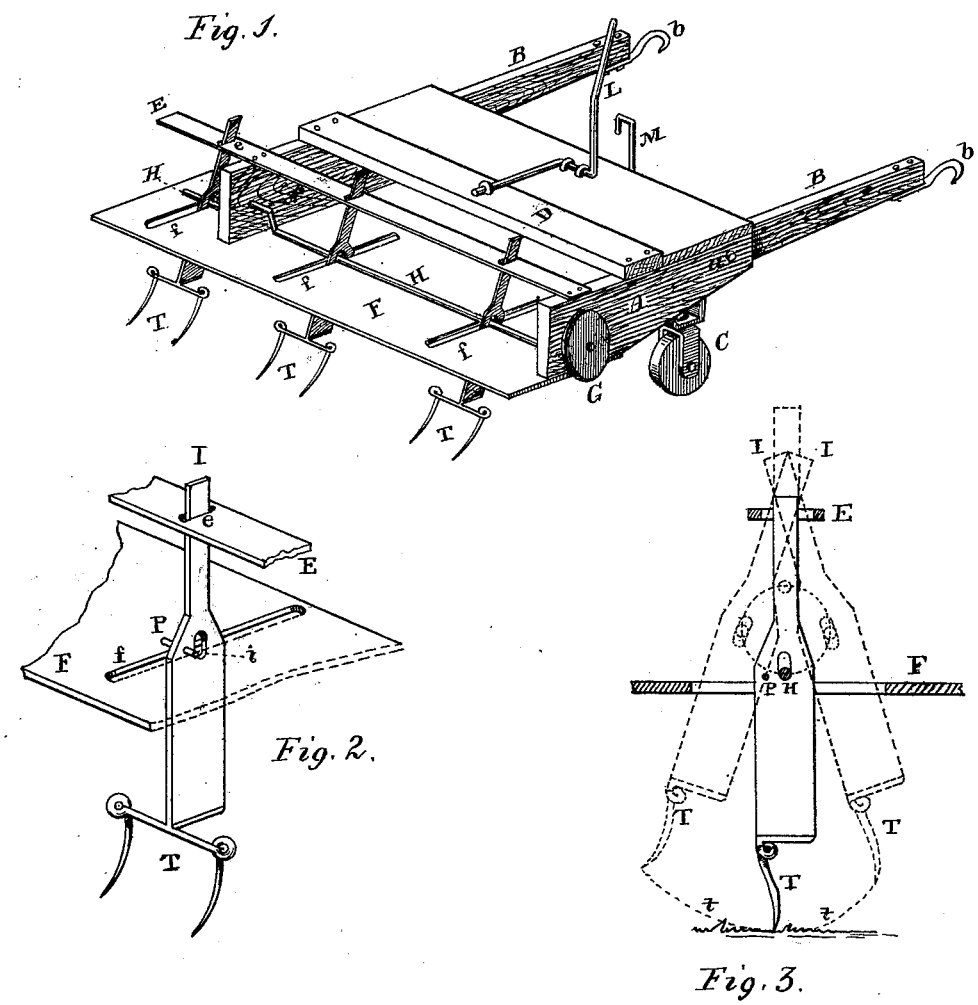

ROBERT J. CLARK, OF CHESTNUT LEVEL, ASSIGNOR OF ONE-THIRD OF HIS RIGHT TO JOHN C. RUTTER, OF SUMMIT HILL, PENNSYLVANIA.

HAY-TEDDER.

SPECIFICATION forming part of Letters Patent No. 231,211, dated August 17, 1880.

Application filed January 31, 1880.

*To all whom it may concern:*

Be it known that I, ROBERT J. CLARK, of Chestnut Level, Lancaster county, and State of Pennsylvania, have invented certain Improvements in Hay-Tedders, of which the following is a specification.

This improvement relates to a class of agricultural implements for stirring and scattering the cut grass, so that it may be more speedily converted into hay by the access of air and sunshine.

The novelty consists in its simplicity, cheapness, and efficiency as an attachment to the truck of a mowing-machine or horse-rake with the rake detached.

The accompanying drawings, with the letters of reference marked thereon, and a brief description, will enable those skilled in the art to make and use the same, in which—

Figure 1 is a perspective view of the tedder ready for attachment to a mowing-machine. Fig. 2 shows one of the bars with the tedder teeth or tines attached. Fig. 3 illustrates the position of the bars at four points of the circle formed by the motion of the crank or operating rod passing through a central eye in the bar.

The frame-work is shown by the side pieces, A A', and cross-piece D, supported on caster-wheels C. This truck, by the side extension-bars, B, and hook or its equivalent b, is attached to the axle of the mower or rake. A strap or chain pulley on the said axle or wheel, in its motion, will give motion to a pulley, G, on the truck. This pulley turns a crank-bar, H, having its bearings in the side pieces, A A'. This rod or bar H is passed through an oblong oval eye, i, in the tedder-bar I and gives it motion. A series of these tedder-bars I are thus arranged across the rear of the truck. I only show three on the drawings, and one of these is outside the truck-frame. These bars, with the attached tedder-tines, are held and guided in slotted cross-pieces E E. The portion of the bars I above the eye, being narrowed, enter through a guide-slot, e, made in the upper cross-bar, E.

On the top of the side pieces, beneath the said side pieces, A, is a wide cross-plate or guide-table, F. This extends beyond the terminus of the truck, and is provided with long parallel oblique slots f, for each of the tedder-bars I to have free play to rise and fall therein. These bars I are also provided with a cross-pin, P, which projects on each side and rests upon the guide-table F outside the slot, and thus holds the tedder-bar in a portion of its motion and causes it to slide parallel with the soil for a sufficient distance to allow the tines T to enter obliquely under the cut grass, so as to fairly raise, turn, and scatter it in its subsequent movement. These tines are of steel, bent spring fashion, so as to be yielding and elastic.

In Fig. 3 the action of the pin P in the tedder-bar is shown by the straight basal line between t and t in the rising and falling of said bars, as the crank-rod makes its circuit outside the common center of its bearings in A A'.

I show a lever attachment, L, and hook or holder M to raise the tedder-tines from the ground when not in use.

The essential features in my arrangement are the guide-table F, with its long parallel more or less oblique guide-slots f, the cross-bar E, in which the upper ends of the tedder-bars are held and have their motion, and the simple free tedder-bars I, actuated by a crank-like rotary rod through a central eye or opening, i, in them, so as to guide the motions of the tedder-bars at their upper end, while the long guide-slots in the guide-table allow them to sink until checked by the pin for a portion of their movement, then advance, rise, and fall successively while performing their work.

This simple and cheap mode of construction has all the advantages of more costly combinations, and may be utilized in various ways and prove a desirable acquisition to farming implements at a moderate price.

I am aware that various devices and machines have been invented for the purpose, in which revolving cylinders are made to carry tines, or bars with tines and separate crank actions variously combined; but I am not aware that tedder-bars perfectly detached, simply held and guided freely in slots, and operated through a central opening by a revolving bar or crank-rod of a continuous or long crank, were ever before known or used as an attachment to a truck or otherwise, which I deem a new implement of manufacture. Therefore,

What I claim as my improvement in hay-tedders is—

The combination of the spring-tines T, tedder-bar I, provided with a check-pin, P, and a central opening, $i$, freely operated by a long crank or rod, H, within long slots $f$, formed in a guide-table, F, while their upper vibrating ends pass through slots $e$ in the upper cross-bar, E, the whole arranged and operated substantially as and for the purpose specified.

R. J. CLARK.

Witnesses:
W. B. WILEY,
JACOB STAUFFER.